(12) United States Patent
Polegato Moretti

(10) Patent No.: US 6,604,302 B2
(45) Date of Patent: Aug. 12, 2003

(54) WATERPROOF SHOE WITH SOLE OR MID-SOLE MOLDED ONTO THE UPPER

(75) Inventor: Mario Polegato Moretti, Crocetta Del Montello (IT)

(73) Assignee: Nottington Holding B.V., Amsterdam (NL)

( * ) Notice: Subject to any disclaimer, the term of this patent is extended or adjusted under 35 U.S.C. 154(b) by 0 days.

(21) Appl. No.: 09/968,980

(22) Filed: Oct. 3, 2001

(65) Prior Publication Data

US 2002/0040537 A1 Apr. 11, 2002

(30) Foreign Application Priority Data

Oct. 10, 2000 (IT) .................................. PD2000A0234

(51) Int. Cl.⁷ ................................................ A43B 23/07
(52) U.S. Cl. ................................................ 36/55; 36/14
(58) Field of Search .............................. 36/55, 14, 12

(56) References Cited

U.S. PATENT DOCUMENTS

| 5,285,546 A | 2/1994 | Haimerl |
| 5,433,021 A | 7/1995 | Mahler |
| 5,983,524 A | 11/1999 | Polegato |

FOREIGN PATENT DOCUMENTS

| DE | 87 17 201 | 5/1988 |
| DE | 38 40 263 | 5/1990 |
| DE | 40 04 674 | 8/1991 |

OTHER PUBLICATIONS

Translation of Patent DE 3840263.*

* cited by examiner

*Primary Examiner*—Ted Kavanaugh
(74) *Attorney, Agent, or Firm*—Oblon, Spivak, McClelland, Maier & Neustadt, P.C.

(57) ABSTRACT

A waterproof shoe whose structure comprises: a breathable upper, which is internally associated with a lining with a membrane permeable to vapor and impermeable to water; an insole, peripherally associated with the upper and the lining; and a sole or mid-sole, made of a material impermeable to water and directly injection-molded at least around the edge region of the assembled upper, lining and insole. The lower edge of the lining protrudes further downward than the upper to form a lower region in which said upper is replaced by a connecting element which is joined to the upper on one side and to the insole on the other side, the connecting element comprising waterproof material which is compatible, for adhesive bonding, with the molding material of the sole or mid-sole.

8 Claims, 1 Drawing Sheet

WATERPROOF SHOE WITH SOLE OR MID-SOLE MOLDED ONTO THE UPPER

BACKGROUND OF THE INVENTION

The present invention relates to a waterproof shoe with sole or mid-sole molded onto the upper.

The possibility of manufacturing a fully waterproof shoe by injection-molding the sole or mid-sole directly onto the upper (with a lining provided with a functional waterproof and breathable membrane), appropriately associated by means of stitches to an assembly insole and fitted therewith onto an upper-holding last, is already known in the shoe-making field.

With this construction, there are problems linked to the fact that the stitches for connecting together the upper and the insole perforate the functional membrane, which accordingly becomes permeable to water, compromising the characteristic of being waterproof.

In order to solve these problems, a shoe has been provided which is disclosed in EP 298360 and comprises a breathable upper internally associated with a lining having a membrane which is permeable to vapor and impermeable to water, an insole perimetrically associated with the upper and the lining, and a sole made of a material which is impermeable to water and is injection-molded under the insole and around the edge region of the upper.

The lower edge of the lining protrudes further downward than the upper, and in this region the upper is replaced by a porous connecting element (in particular by a mesh) which is sewn to the upper on one side and to the insole and lining on the other side.

In this manner, the porosity of the material of the connecting element allows the material of the sole while liquid, during the step for injection-molding, to penetrate and close all the stitch holes.

Usually, a band of polyester mesh is used for the material of the connecting element; such band is a scarcely elastic body and therefore is unable to stretch perfectly, especially in the region of the heel and toe of the shoe.

This causes difficulties in production and in particular lack of uniformity during the step of injection-molding, with consequent formation of channels and lack of waterproofing.

The shoe disclosed in U.S. Pat. No. 5,505,011 is also known.

This shoe comprises a breathable upper internally associated with a lining having a membrane which is permeable to vapor and impermeable to water, an insole which is sewn perimetrically to the lower edge of the lining and protrudes further downward than the upper, and a sole which is made of a material impermeable to water and is injection-molded below the insole and around the edge region of the upper and of the lining.

The lining and the upper are joined together in the edge regions by means of adhesive.

This shoe is difficult to manufacture because of the different elasticity of the lining and of the upper, which leads to the formation of unaesthetic creases.

Moreover, problems in terms of lack of waterproofing have been noted and are due to fact that the upper cannot be glued at the same height along the entire perimeter of the lining.

SUMMARY OF THE INVENTION

The aim of the present invention is to provide a waterproof shoe with sole or mid-sole molded onto the upper which eliminates the above mentioned drawbacks of the prior art.

Within this aim, an object is to provide a shoe which can be conveniently manufactured either with a sole which is simply waterproof or with a sole which is both waterproof and breathable.

Another object is to provide a shoe whose cost is competitive with respect to that of known shoes of the same type.

This aim and these and other objects and others which will become better apparent hereinafter are achieved by a waterproof shoe whose structure comprises:

a breathable upper, internally associated with a lining with a membrane which is permeable to vapor and impermeable to water, an insole, peripherally associated with the upper and the lining, a sole or mid-sole, made of a material which is impermeable to water and is directly injection-molded at least around the edge region of the assembled upper, lining and insole, the shoe being characterized in that the lower edge of said lining protrudes further downward than said upper and in that in said region said upper is replaced by a connecting element which is joined to said upper on one side and to the insole on the other side, said connecting element comprising waterproof material compatible, in terms of adhesive bonding, with the molding material of said sole or mid-sole.

BRIEF DESCRIPTION OF THE DRAWINGS

Further characteristics and advantages of the invention will become better apparent from the detailed description of some embodiments thereof, illustrated only by way of non-limitative example in the accompanying drawings, wherein.

DESCRIPTION OF THE PREFERRED EMBODIMENTS

Figure 3:
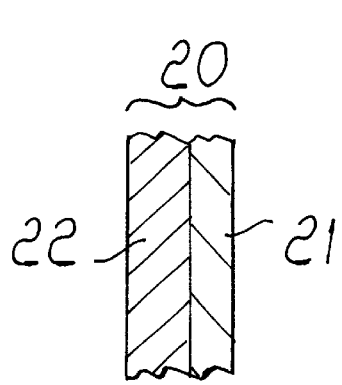
FIG. 3 is a sectional view of a detail of one of the components of the shoe.
Figure 1:
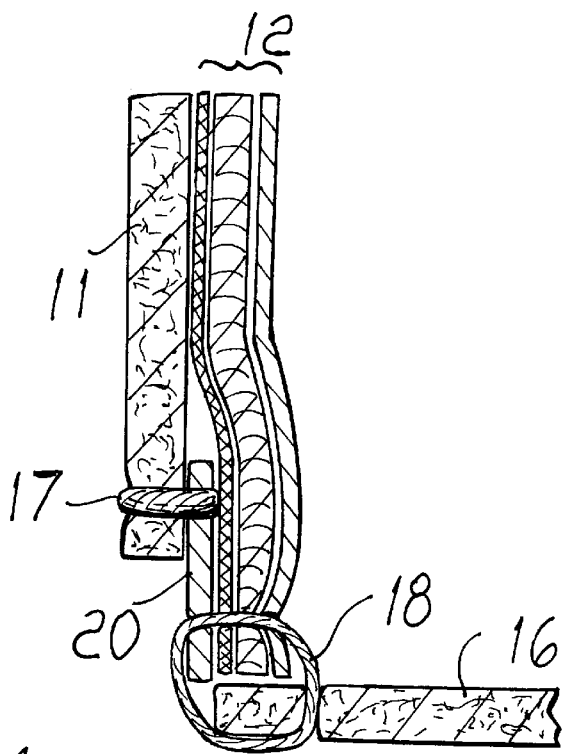
FIG. 1 is an enlarged-scale cross-sectional view of the assembled components of the shoe of FIG. 1 before molding the sole.
Figure 2:
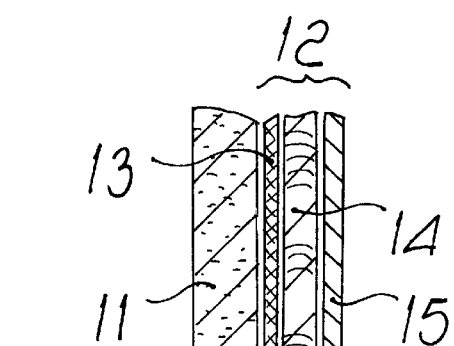
FIG. 2 is an enlarged-scale cross-sectional view of the shoe of FIG. 1, once it is finished.
Figure 2:
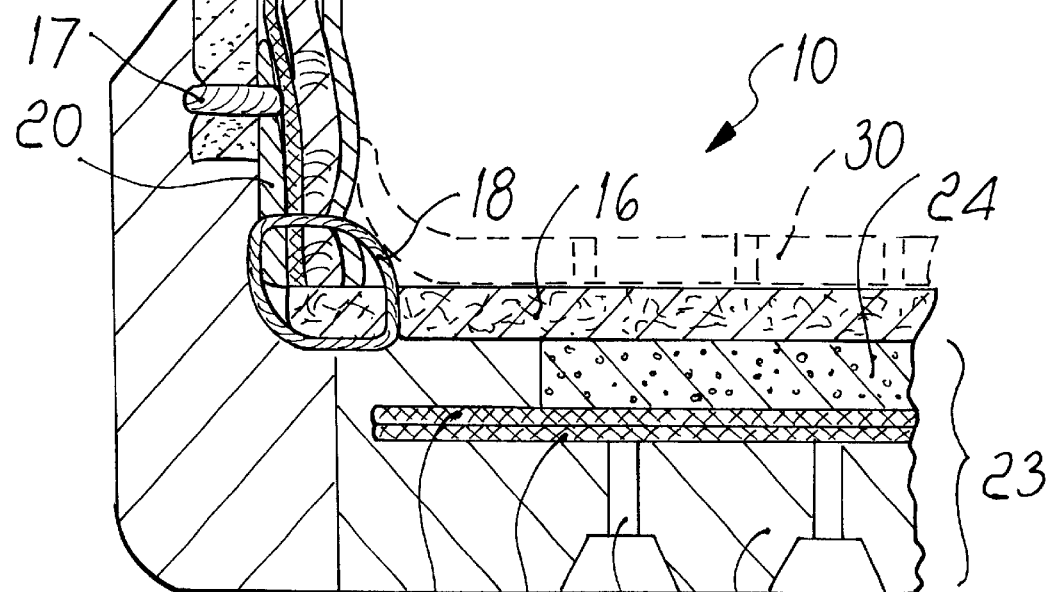

With reference to FIGS. 1 to 3, a waterproof shoe having the structure according to the invention is generally designated by the reference numeral 10 in a first embodiment.

The shoe 10 comprises a breathable upper 11, made for example of natural leather without covering pigments, which is associated with a lining 12 constituted in succession by a membrane 13 which is permeable to vapor and impermeable to water (usually expanded polytetrafluoroethylene) and is arranged on the side of said upper 11, by a padding layer 14 (made for example of open-cell foamed material or felt), and by an internal fabric 15.

In other cases, the lining may of course not have at least one of the layers 14 and 15 and/or may have layers made of different materials.

The lining 12 can be associated with the upper 11 by spot gluing, so as to avoid compromising breathability through the membrane 13.

The shoe 10 also comprises an assembly insole 16 (preferably made of breathable materials such as fabric, leather, felt, cellulose material, et cetera, or perforated materials), which is peripherally associated with the upper 11 and the lining 12 as explained in detail hereinafter.

The shoe 10 further comprises, in this case, a sole, generally designated by the reference numeral 19, which is described in more detail hereinafter, said sole being injection-molded directly at least around the edge region of the upper 11 and being made of a material such as polyurethane at least in said edge region.

According to the invention, the lower edge of the lining 12 protrudes further downward than the upper 11, and in this region the upper 11 is replaced by a connecting element 20 (for sealing the membrane 13), which is joined on one side to the upper 11 and on the other side to the insole 16 and to the lining 12 and is made of an impermeable material which is compatible for adhesive bonding with the molding material of the sole 19.

Joining is provided by means of stitched seams 17 and 18, the second one of which, between the element 20, the lining and the insole, is of the so-called Strobel type.

The connecting element 20 is preferably constituted by a sheet formed by two layers, a first one of which, designated by the reference numeral 21, is directed toward the lining 12 and is made of a material which is capable of sealing the membrane 13 (for example polyurethane) and whose melting point is lower than the temperature generated during molding (80–110° C.), for example approximately 60° C.

The second layer 22 can instead be made of fabric or a polymer which is compatible with the material of the sole 19 and has a higher melting point than the first layer 21 so that it does not melt during the operation for preparing the upper part of the shoe 10 on the last (not shown), which occurs by applying heat.

The first layer 21 can instead be melted and joined to the membrane 13 also during such preparation as well as during the step of the actual injection-molding of the sole 19.

When the sole 19 is injection-molded, the pressure and heat generated by the melted polymer propel and partially melt the element 20 and in particular melt the first layer 21, sealing the lining 12 and rendering the shoe 10 fully waterproof.

In the case being considered, the sole 19 is composite, since it has an insert 23 (produced separately), which is located at least at the forefoot and comprises in succession: a filler layer 24 made of breathable material, such as felt or perforated material; a membrane 25, permeable to vapor and impermeable to water; a protective layer 26, coupled to the membrane 25 and made of a material which is resistant to hydrolysis, water-repellent, and breathable or perforated; and a tread 27 with through holes 28 between the protective layer 26 and the region for contact with the ground.

The peripheral edges of the membrane 25 and of the protective layer 26 are conveniently sealed by the polyurethane mass of the tread 27.

The sole 19 further comprises an element 29 which surrounds the insert 23 and constitutes the injection-molded part that sealingly connects said insert 23 to the upper 11.

Of course, if the sole 19 only needs to be waterproof, it can be constituted by a single block of plastic material, such as polyurethane which is injection-molded over the upper 11, or by a tread which is formed separately and is joined to the upper 19 by injection-molding of at least one connecting mid-sole.

The shoe is completed by an inner sole 30, which is perforated and/or breathable and is made for example of leather.

In practice it has been observed that the intended aim and objects of the present invention have been achieved.

A shoe has in fact been obtained in which the problems noted in the known art have been eliminated.

The shoe 10 is fully waterproof and is breathable in the regions of the upper 11 and at the lower edges of the upper 11 and of the lining 12 (by way of the seal produced by the at least partial melting of the connecting element 20 with the corresponding part of the sole 19 and/or of the membrane 13) and in this case of the tread as well, but in other cases the sole 19 can be constituted by a single block made of polyurethane or other suitable plastics, if simple waterproofing is preferred for it.

The invention thus conceived is susceptible of numerous modifications and variations, all of which are within the scope of the appended claims.

In practice, the materials used, so long as they are compatible with the contingent use, as well as the dimensions, may be any according to requirements.

The disclosures in Italian Patent Application No. PD2000A000234 from which this application claims priority are incorporated herein by reference.

What is claimed is:

1. A waterproof shoe having a structure comprising:
    a lining with a lining membrane which is permeable to vapor and impermeable to water;
    a breathable upper, internally associated with the lining;
    an insole, which is perimetrically associated with the upper and the lining;
    a sole element, which is made of a material impermeable to water which is directly injection-molded at least around an edge region of all of the upper, the lining, and the insole, when assembled, a lower edge of the lining protruding further downwardly than the upper to form a lower region; and
    a connecting element which replaces, at the lower region, the upper, the connecting element being joined to the upper on one side and to the insole on the other side, and comprising waterproof material being compatible, for adhesive bonding with the injection-molded material of the sole element, the connecting element being constituted by a sheet formed by at least two layers, a first layer which is directed toward the lining and is made of a first material adapted for sealing the lining membrane, the first material having a melting point which is lower than a temperature generated during molding, and a second layer being made of any of a fabric or a second material compatible with the injection-molded material of the sole element, the second material having a higher melting point than the first material in order to avoid melting thereof during preparation of an upper part of the shoe, by way of heat application.

2. The shoe of claim 1, further comprising stitches, the connecting element being joined to all of the upper, the lining, and the insole via the stitches.

3. The shoe of claim 2, wherein the sole element is constituted by a single blot of plastic material which is injection-molded onto the upper.

4. The shoe of claim 2, wherein the sole element is constituted by a tread which is produced separately and is joined to the upper by injection-molding of at least one connecting mid-sole.

5. The shoe of claim 1, wherein the sole element is a composite, including an insert which is produced separately and is located at least at a forefoot of a wearer of the shoe, the insert comprising in succession:
    a filler layer made of breathable material, selectable from a group comprising felt and perforated material;

an insert membrane, being permeable to vapor and impermeable to water;

a protective layer, coupled to the insert membrane and made of material which is resistant to hydrolysis, water-repellent, and any of breathable and perforated;

a tread with through holes between the protective layer and a ground contact region; and peripheral edges of the insert membrane and of the protective layer being sealed by a polyurethane mass constituting the tread, and the sole element further comprising:

an element which surrounds the insert and constitutes an injection-molded part that hermetically connects the insert to the upper.

6. A waterproof shoe comprising:

a breathable upper;

a lining arranged inside of the upper, the lining comprising a membrane layer which is water impermeable and vapor impermeable;

an injection-molded sole; and a connecting element, the connecting element being arranged between the lining and the upper, the connecting element comprising an outer layer heat-joined to the upper and the sole, and the connecting element comprising an inner layer heat-joined to the membrane layer of the lining, the outer layer having a melting point higher than a melting point of the inner layer.

7. The shoe of claim 6, wherein the lining has a lower end extending below a lower edge of the upper, and the connecting element has an upper portion connected to the upper and a lower portion connected to the lower end of the lining.

8. The shoe of claim 7, further comprising:

an assembly insole;

first stitches which connect the upper portion of the connecting element to the upper; and second stitches which connect the lower portion of the connecting element, the lower end of the lining, and the assembly insole.

* * * * *